United States Patent
Priepke et al.

(10) Patent No.: US 7,219,961 B2
(45) Date of Patent: May 22, 2007

(54) PIVOTING SEAT

(75) Inventors: Edward H. Priepke, Lancaster, PA (US); Levi Taylor, Scottsville, VA (US)

(73) Assignee: CNH America LLC, New Holland, PA (US)

( * ) Notice: Subject to any disclaimer, the term of this patent is extended or adjusted under 35 U.S.C. 154(b) by 127 days.

(21) Appl. No.: 11/100,173

(22) Filed: Apr. 6, 2005

(65) Prior Publication Data

US 2006/0226685 A1    Oct. 12, 2006

(51) Int. Cl.
A47C 1/00    (2006.01)
(52) U.S. Cl. ............... 297/344.21; 296/65.06
(58) Field of Classification Search ........... 297/344.21; 296/65.06, 65.07
See application file for complete search history.

(56) References Cited

U.S. PATENT DOCUMENTS

| | | | |
|---|---|---|---|
| 1,803,063 A | 4/1931 | Hultgren | |
| 1,916,800 A | 7/1933 | Hultgren | |
| 2,148,187 A | 2/1939 | Burnham | |
| 2,200,904 A | 5/1940 | Van Derveer et al. | |
| 3,013,837 A * | 12/1961 | Pessl et al. | 296/68.1 |
| 4,417,715 A | 11/1983 | Edwards | |
| 5,474,353 A * | 12/1995 | Koester et al. | 297/344.21 |
| 6,027,170 A * | 2/2000 | Benz et al. | 297/344.21 X |
| 6,513,872 B2 | 2/2003 | Bar | |

FOREIGN PATENT DOCUMENTS

JP    63162347 A  *  7/1988

* cited by examiner

*Primary Examiner*—Anthony D. Barfield
(74) *Attorney, Agent, or Firm*—Stephen A. Bucchianeri; John William Stader; Michael G. Herms

(57) ABSTRACT

An operator seat for a work vehicle is provided that is pivotable between at least two operating stations.

14 Claims, 9 Drawing Sheets

PIVOTING SEAT

FIELD OF THE INVENTION

The invention relates generally to work vehicles, and more particularly to tractors or work vehicles that are operated in a forward-facing and rear-facing mode. Even more particularly it relates to seats for such vehicles that pivot to face both frontward and backward.

BACKGROUND OF THE INVENTION

Tractors and other work vehicles typically operate in a forward-facing mode, with one steering wheel located immediately in front of the operator. The steering wheel is used in conjunction with accelerator pedal, brake pedal and other transmission controls to drive the vehicle over the work terrain. Occasionally, it is necessary to drive the vehicle in a reverse direction, and the vehicle operator will turn his head and look behind to do this.

For some tasks, it is necessary to operate the vehicle in a reverse direction for prolonged periods of time. It has been common practice to have a second steering location for this purpose, whereby the operator moves to the second (rear-facing) steering location to operate the vehicle in reverse. Having multiple operating stations or steering wheels on a vehicle to allow prolonged reverse operation is not uncommon.

One problem in designing tractors with multiple workstations is determining how to move the seat to alternately face forward and backward.

The simplest arrangement would be to mount the seat on a single center pivot that will permit the entire seat to rotate about fixed point from a forward-facing position to a rear-facing position. In this arrangement, the seat has a pivot point located as closely as possible to the fore and aft center of the seat. The operator can release the seat and rotate it about this center pivot point.

Since the space in the cab of an agricultural tractor is limited, a simple single pivot arrangement does not provide the operator's legs with sufficient room. When the operator rotates such a seat, the operator's knees bang up against the side of the operator compartment.

Furthermore, the operating stations may be spaced so closely together that the seat must not only rotate but must also slide backward or forwards to position the operator in substantially the same position with respect to the controls of the second operating station as the operator was to the first operating station. Mere rotation of the seat around its center point may not position the operator in the proper front-to-rear position within the cab necessary to allow easy operation of controls at both workstations.

For this reason, a more complex movement of the operator seat is required. The seat should simultaneously rotate and translate with respect to the operator compartment. The prior art teaches a variety of seat arrangements that permit simultaneous seat translation and rotation.

U.S. Pat. No. 6,513,872, for example, shows a piece of furniture with a seat portion that can be pivoted with respect to an adjacent seat portion and to fixed back arrests to convert from a chaise lounge (plus adjacent chair) to a sofa by pivoting 90°. The back portions are fixed, and the pivoting seat portion is supported on two parallel plates that translate and rotate with respect to each other. The plates are coupled together using a cam slot that defines a linear path of translation for the center of the seat and a control link that controls the angle of rotation of the seat. Only one seat portion is moved. The other seat portion stays stationary.

U.S. Pat. No. 1,916,800 shows a seat support for simultaneously reversing two seats for seating two people side-by-side while laterally shifting the seat. The seat support is coupled directly to a pitch seat and has two cam slots, each with a follower. One slot is a straight line and the other is a large radius curve. Both of the two seats can be simultaneously rotated 180°.

U.S. Pat. No. 2,200,904 shows a pair of seats for seating to people side-by-side in a bus or train, both of which are supported on a common seat support having two parallel plates, one having a U-shaped cam slot that engages a pin in the other plate and a control link pivotally coupled to both plates. Both seats can be simultaneously rotated 180°.

U.S. Pat. No. 1,803,063 similarly shows a pair of seats adjacent one another for a railroad coach, both of which are fixed to a common central seat support, the seat support that has two cam slots, one straight, and one curved, each cam slot having a corresponding follower. Both seats can be simultaneously rotated 180°.

U.S. Pat. No. 2,146,187 shows two seats adjacent to one another for a railway coach or bus. The seats are fixed to a common support, which is in turn pivotally coupled to the vehicle by two pivoting mechanical links with cam followers at the end that are guided through a "Y"-shaped slot.

U.S. Pat. No. 4,417,715 shows two seats adjacent to one another and facing the same direction that are coupled to a common base for use in intercity buses. Both seats are coupled to a common seat support that includes a "Y"-shaped cam slot in which move two cam followers fixed with respect to both seats. To insure the cam followers never both go into the same branch of the "Y", a spring loaded switch lever is provided that in blocks one cam follower.

All of the seating systems illustrated in the foregoing patents are configured to rotate two seats 180°, while at the same time causing each of the two seats to exchange places with the other of the two seats. Thus, each seat of the two seats in each pair of seats both (1) rotates 180° and (2) translates sideways one complete seat width.

There is not enough space in a tractor cab to have two seats side-by-side. Furthermore, even if one of the two seats in the prior art references was removed, the remaining seat would still be translated sideways one entire seat width. The amount of room required to rotate the seats is greater than the amount provided in the cab of an agricultural tractor.

Another drawback to these prior art mechanisms as their inability to rotate the seat 180° while keeping the seat oriented on the same longitudinal axis. When a seat in an agricultural tractor is rotated it must stay long the same central longitudinal centerline. It must rotate, generally, about a point right underneath the operator's posterior. Only in this manner can the operator the located along the centerline of the vehicle in both the front-facing and a rear-facing direction. The prior art embodiments not only rotate two seats 180°, they also move the seats sideways by one seat width.

What is needed, therefore is an operator seat for a work vehicle that rotates 180° to face forward and backwards.

What is also needed is a seat that is centered on the longitudinal axis of the vehicle in both of its 180° opposed positions.

What is also needed is a single width operator seat for work vehicle that fits into the narrow confines an agricultural tractor compartment.

What is also needed is a seat that can be rotated in a confined space without the operator having to rise from his seated position.

What is also needed is a seat that rotates in place between two opposed vehicle operating stations and requiring minimal adjustment and room to be located in proper position next to the operator controls.

These and other objects of the invention are provided by the pivoting operator seat described below.

SUMMARY OF THE INVENTION

In accordance with a first aspect of the invention, a pivoting seat assembly for a work vehicle having a central longitudinal axis is provided, the seat assembly comprising a solo seat; a sliding mechanism for sliding the solo seat forward and backward coupled to the solo seat; an upper plate coupled to the sliding mechanism, the upper plate defining a first cam element; and a lower plate coupled to the upper plate, the lower plate defining a second cam element configured to engage the first cam element and to guide the first cam element along a curved cam path.

The first and second cam elements may constrain the seat to rotate from 0° to 180° and to lock the seat in both positions. One of the first and second cam elements may be a first cam follower and another of the first and second cam elements may be a first cam track. The pivoting seat assembly may further include a second cam follower; and a second cam track interengaged with the second cam follower; wherein said first and second cam followers are fixed with respect to one of the first and second plates, and further wherein said first and second cam tracks are fixed with respect to a second of the first and second plates. The pivoting seat assembly may further include first and second cam followers fixed to the upper plate and the lower plate defines first and second separated cam paths, and further wherein the first cam follower is disposed in the first cam path and the second cam follower is disposed in the second cam path. The pivoting seat assembly may also include a manually operable locking pin coupled to the upper plate and configured to engage the lower plate in both a forward-facing position and a rear-facing position. The pivoting seat assembly may comprise a first manually-operable seat lock configured to lock the sliding mechanism and a second seat lock configured to lock the first and second plates with respect to one another.

In accordance to a second aspect of the invention, a pivoting seat assembly for a work vehicle having a central longitudinal axis is provided, comprising a seat; a means for sliding the solo seat forward and backward coupled to the seat; an upper plate coupled to the sliding mechanism, the upper plate defining a first cam means; and a lower plate coupled to the upper plate, the lower plate defining a second cam means configured to engage the first cam means and to guide the first cam means along a curved non-circular cam path.

The first and second cam means may constrain the seat to rotate about a vertical axis from a first position to a 180 degree opposed position. One of the first and second cam means may be a first cam follower and another of the first and second cam means may be a first cam track. The pivoting seat assembly may further comprise a second cam follower extending from the upper plate that is configured to engage a second cam track, wherein the second cam track does note intersect the first cam track. The pivoting seat assembly may also include first and second cam followers fixed to the upper plate, wherein the lower plate defines first and second non-intersecting cam paths, and the first cam follower is disposed in the first cam path and the second cam follower is disposed in the second cam path. The pivoting seat assembly may also comprise a manually operable locking pin coupled to the upper plate and configured to engage the lower plate in both a forward-facing position and a rear-facing position. The pivoting seat assembly may include at least four bearings fixed to the lower plate to support the upper plate and permit omnidirectional movement of the upper plate with respect to the lower plate.

In accordance with a third aspect of the invention a pivoting support for an operator seat of a work vehicle is provided, including an upper plate configured to be fixed to a solo seat, the upper plate further including, a generally rectangular plate having an upper surface and a lower surface, first and second cam followers fixed to the rectangular plate and extending downward from the lower surface, and a locking pin extending downward from the lower surface; and a lower plate configured to be fixed to a seat support in the operator compartment.

The pivoting support may include a plurality of spaced-apart ball bearings fixed to the lower plate and configured to support the upper plate and to accommodate omnidirectional movement of the upper plate with respect to the lower plate. The lower plate may define first and second cam paths, and the first and second paths may be disposed to receive the first and second cam followers. The pivoting support may further include a metal strap extending between and coupling lower ends of the cam followers, the metal strap further being configured to retain the upper plate on the lower plate. The pivoting support may further include a plurality of spaced-apart ball bearings disposed between the lower plate and the upper plate, wherein the upper plate uncovers at least one of the ball bearings during a portion of its relative rotation with respect to the lower plate. The upper plate may be configured to be fixed to and support a seat elevator and a seat mounted thereon, and the lower plate may be configured to be fixed to and supported by a raised seat platform.

BRIEF DESCRIPTION OF THE DRAWINGS

The invention will be more fully understood from the following detailed description, taken in conjunction with the accompanying drawings, wherein like reference numerals refer to like elements, in which.

DETAILED DESCRIPTION OF THE PREFERRED EMBODIMENTS

Figure 3:
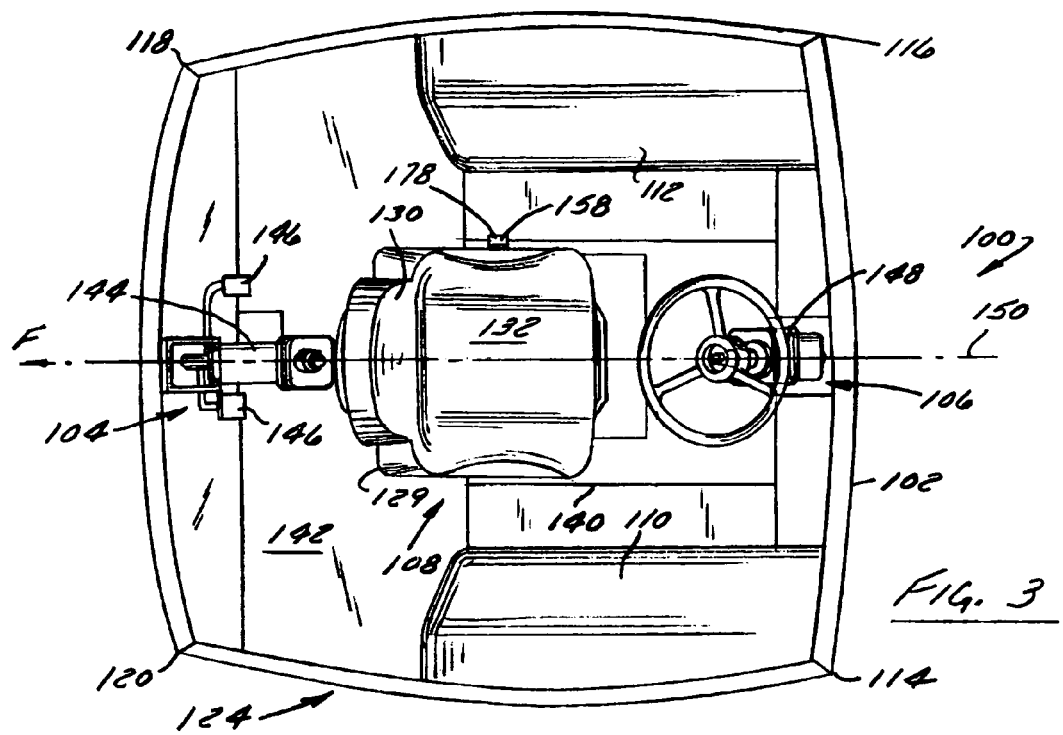
FIG. 3 is a plan view of the operator compartment of the foregoing FIGURES showing the operator seat in a rear-facing position centered on the same longitudinal axis of the work vehicle.

The terms "vehicle operating station" and "operating station" refer to a location on a vehicle having a plurality of controls located within operating distance of an operator disposed at that location. The plurality of controls can be operable by either hand or foot. The plurality of controls include at least two of the following: a steering control member (e.g. a steering wheel), a brake control member (e.g. a brake pedal), an engine accelerator control member (e.g. an accelerator pedal), a clutch control member (e.g. a clutch pedal), a shift control member (e.g. a shift lever), and a vehicle implement control member (e.g. a joystick or lever configured to move components of a backhoe, bucket, excavator, or stabilizer). This list of controls and control members is not limiting. Other operating controls may also be located at the operating station.

FIGS. 1-5 are top and side views of the operator compartment of work vehicle showing the operator seat in a variety of rotational positions. Work vehicle 100, here illustrated as an agricultural tractor, has an operator compartment 102 shown here with its walls and windows removed for ease of viewing. The operator compartment 102 includes a first, forward facing vehicle operating station 104, a second, rearward facing operating station 106, a seat assembly 108 that is pivotable between these two operating stations and is positioned between two rear wheel shrouds 110, 112.

The outer shell of the operator compartment is defined by four vertically extending frame members 114, 116, 118, 120 that are coupled together at their upper ends to form a top 122 over which an outer skin is fixed. A door opening 124 to which a door is coupled is provided along the left side of vehicle 100.

The front or forward operating station 104 includes a steering wheel assembly 144 that extends from a front wall of the operator compartment. Station 104 also includes brake and clutch pedals 146 located adjacent to floor 142 on either side of steering wheel 144.

The rear operating station 106 similarly includes a steering wheel assembly 148 that extends from a rear wall of the operator compartment as well as pedals 146 similar in construction, location, and operation as pedals 146 in the front or forward operating station.

Operating stations 104, 106 and seat assembly 108 are all disposed along a longitudinal centerline 150 of vehicle 100. Seat assembly 108 positions seat 129 along the centerline in both its forward facing and rear-facing orientations. This positions the operator perfectly with respect to the vehicle and the implements to permit him to look width equal ease down either side of the vehicle. This is not a problem with automobiles, railway coaches, or buses, since these vehicles do not travel backwards and forwards through fields, but over roads. Since vehicles may only be operated on one side of a road, the operator seat is preferably shifted to a location adjacent the centerline of the road where the operator has a clear view ahead and behind the vehicle of both lanes.

Seat assembly 108 is disposed between left and right wheel shrouds 110, 112 that extend across the top of the vehicle's large rear wheels. Seat assembly 108 includes a seat 129 having a seat back 130 and a seat bottom 132, a seat sliding mechanism 134, a seat elevator 136, and a seat rotating mechanism 138. The seat assembly 108 is mounted on top of a seat platform 140 which is fixed to and extends upward from the floor 142 of the operator compartment.

The seat back and seat bottom are configured to wrap around the back and posterior of an operator. Both the back and the bottom are between 16 and 26 inches wide. The back extends substantially from the base of the operator's spine to the operator's skull, or 18 to 30 inches. The bottom extends from the base of the operator spine to just behind the operator's knees, or 18 to 24 inches. When seat 129 is in the forward-facing position shown in FIGS. 1 and 2, the steering wheel is spaced close enough to the seat to permit the operator to grasp the steering wheel and operate the pedals while remaining seated, with his back against the seat back. The same is true when seat 129 is in the rear-facing position shown in FIGS. 3 and 4.

Seat 129 is coupled to a seat sliding mechanism 134, which permits it to slide forward (i.e. "forward" from the operator's frame of reference, and not the vehicle's frame of reference) and backward when the operator manipulates slide release mechanism 152. This permits the operator to adjust the position of seat 129, moving it toward or away from operating stations 104,106 independently of any positioning or movement provided by the seat rotating mechanism 138. Seat sliding mechanism 134 and seat rotating mechanism 138 operate independently of each other. Mechanism 138 can be fixed in place, permitting no movement whatsoever, and seat 129 can nevertheless be moved by the sliding mechanism 134 both forward and backward along the longitudinal centerline 150 of the vehicle.

Sliding mechanism 134 is mounted on seat elevator 136. The mechanical components of elevator 136 are shown herein encased in a rubber boot or bellows. Seat elevator 136 comprises the rubber boot, a multi-bar mechanical linkage (not shown), and at least one gas shock (not shown), all of which interoperate to permit the seat 129 to be moved to a plurality of vertical operating positions. This arrangement is of conventional design, and therefore is not illustrated or described in detail herein.

Seat elevator 136 is, in turn, is coupled to an upper plate 154 of seat rotating mechanism 138. This mechanism a shown in more detail in FIGS. 7-11, and particularly in FIGS. 7-8, in which a lower plate 156 of seat rotating mechanism 138 is fixed to seat platform 140. A rotation release 158 is provided along the left hand side of seat 129 for manipulation by the operator to release seat rotating mechanism 138, thereby permitting seat 129 to rotate with respect to the operator compartment.

Figure 7:
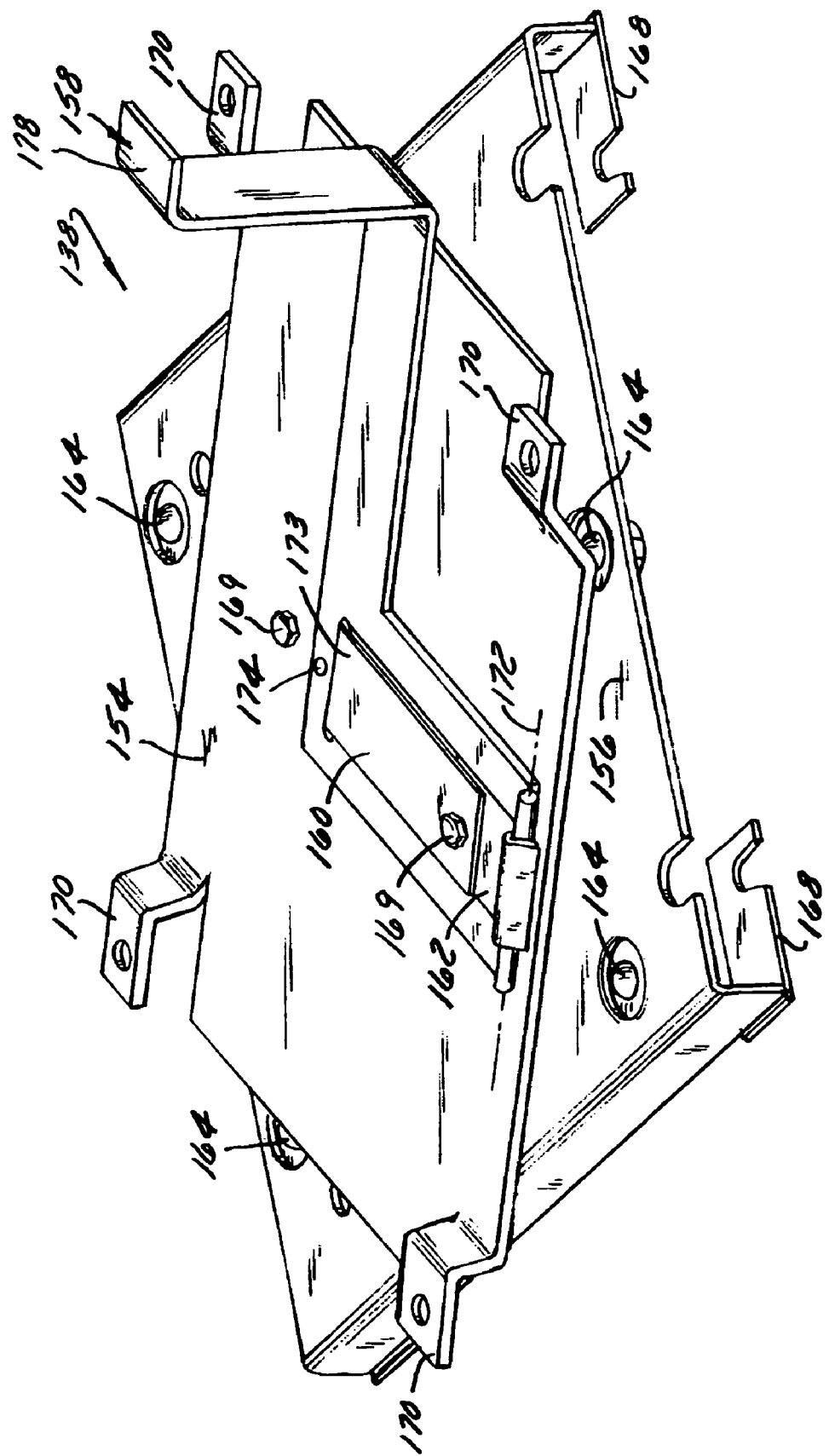
FIG. 7 is a top perspective view of the mechanism for rotating the seat.
Figure 8:
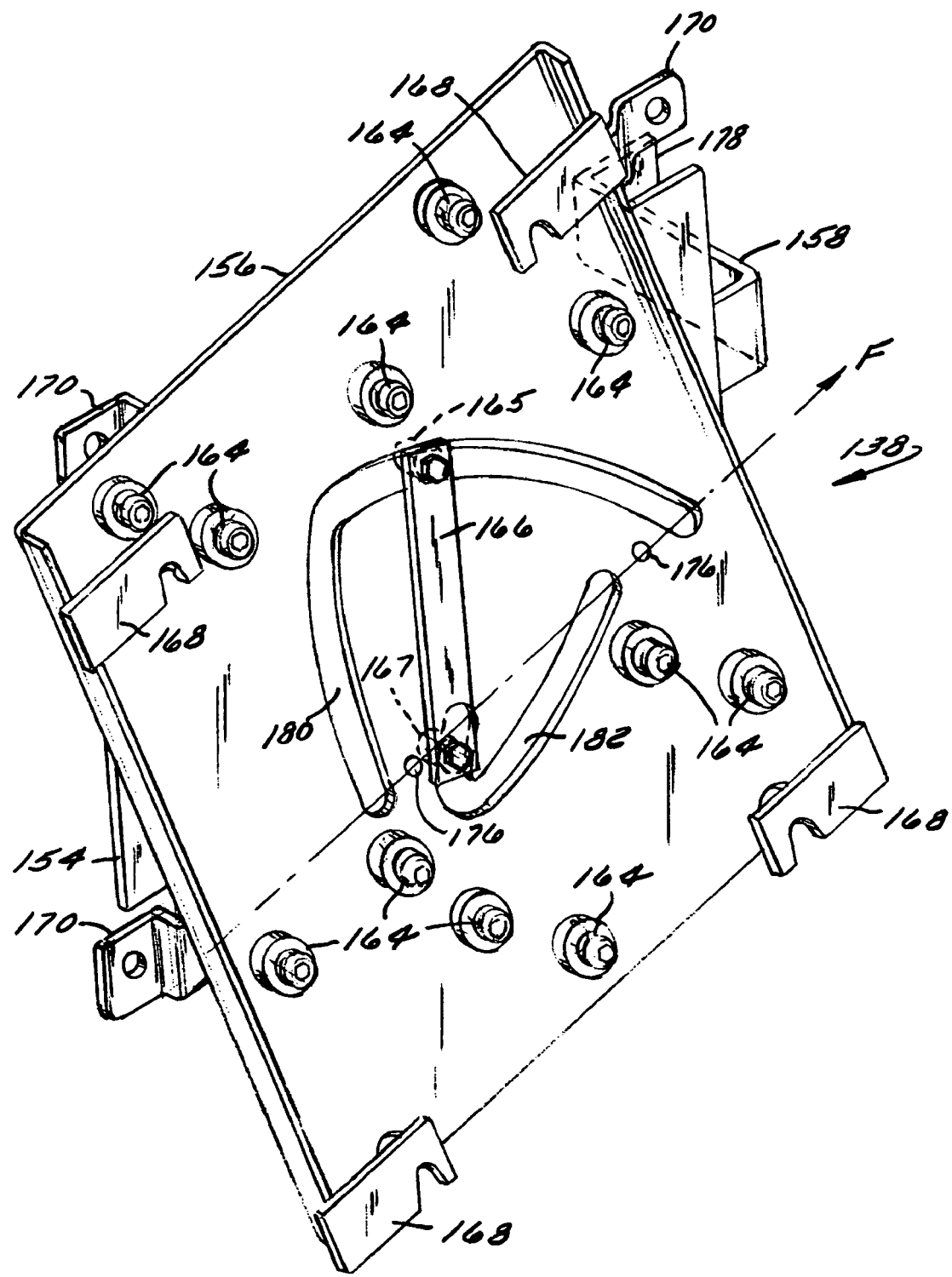
FIG. 8 is a bottom perspective view of the mechanism for rotating the seat.

Referring now to FIGS. 7-8, the rotating mechanism 138 includes upper plate 154, lower plate 156, rotation release 158, release spring 160, release pivot 162, bearings 164, cam followers 165, 167, tie strap 166, floor mount brackets 168 and seat mount brackets 170.

Upper plate 154 is generally planar. It is fixed to the bottom of seat elevator 136 by 4 threaded fasteners (not shown) that extend through seat mount brackets 170 and upward into the bottom of seat elevator 136.

Upper plate 154 supports rotation release 158 for rotation about axis 172. Release pivot 162 is fixed to the top of upper plate 154 and fixes rotation release 158 to the top of plate 154 for pivotal rotation with respect to upper plate 154 about axis 172.

Release spring 160 is fixed at one end to upper plate 154. Spring 160 has a free end 173 that abuts release 158 and is tensioned to hold release 158 in the position shown in FIG. 7. A locking pin 174 is fixed to and extends downward from rotation release 158, through a clearance hole (not shown) in plate 154 and into one of two corresponding locking holes 176 (see FIG. 8) in lower plate 156. Spring 160 holds release 158 in the position shown in FIG. 7, thereby holding locking pin 174 in position in plate 156.

To release the upper plate from the lower plate thereby permitting relative rotation, the operator, while sitting in seat 129, grasps and pulls an upper portion 178 of release 158 upward, thereby withdrawing pin 174 from plate 156, then rotates seat 129 until the seat is in its 180 degree opposite position. The operator then releases upper portion 178. Once released, release 158 moves downwards under the force of spring 160, pushing locking pin 174 downward until it is inserted into corresponding locking hole 176 in plate 156. In this manner, release 158 can lock seat 129 in both its forward facing position (FIG. 1) and its rear-facing position (FIG. 3).

Upper plate 154 is supported on lower plate 156 by bearings 164. Bearings 164 are preferably ball bearings, each of said bearings having an upwardly-facing ball which rolls freely to support upper plate 154 and to accommodate motion of upper plate 154 in any direction with respect to lower plate 156. Alternatively, bearings 164 can be polymeric pads fixed to the upper plate or to the lower plate. The pads are preferably PTFE, nylon, polyethylene, or polypropylene, and more preferably high molecular weight polyethylene or polypropylene.

Two cam followers 165, 167 are fixed to the bottom of plate 154 and extend downward into two cam tracks or slots 180, 182. Cam follower 165 is supported in cam track 180, and cam follower 167 is supported in cam track 182. An elongate metal tie strap 166 extends from one cam follower to another, and has a hole at each of its ends that is configured to receive threaded fasteners 169. Fasteners 169 extend through the ends of tie strap 166, through cam followers 165, 167, and are bolted to upper plate 154.

Cam tracks 180, 182 are curved over their entire length. They curve around the center of plates 154, 156, generally describing two arcs having facing concavities. The position of each cam follower in its cam track defines the position of the other cam follower in its cam track. In other words, the position of one cam follower is a function of the position of the other cam follower. Given the position of one cam follower in its cam track, one can determine the exact position of the other cam follower in its cam track regardless of the sequence of rotations of the seat.

When the operator pulls upward on the upper portions 178 of rotation release 158, locking pin 174 is withdrawn from locking hole 176. With the locking pin withdrawn, upper plate 154 moves easily with respect to plate 156 on bearings 164. Cam followers 165, 167 slide in their respective cam tracks 180, 182, controlling the movement of the upper plate to follow a predetermined path with respect to the lower plate. Plate bearings 164 are omnidirectional, and permit the two plates to translate and rotate with respect to each other in any manner defined by the cam followers and the cam tracks. The upper plate is constrained by the bearings to translate and rotate omnidirectionally with respect to the lower plate in a plane defined by the bearings.

The two cam tracks 180, 182 are dimensioned to permit free rotation of upper plate 154 with respect to lower plate 156 to provide 180 degrees of relative rotation. Since seat 129 is fixed to upper plate 154, seat 129 also rotates through the same 180 degrees of relative rotation following the same path that upper plate 154 follows.

Figure 1:
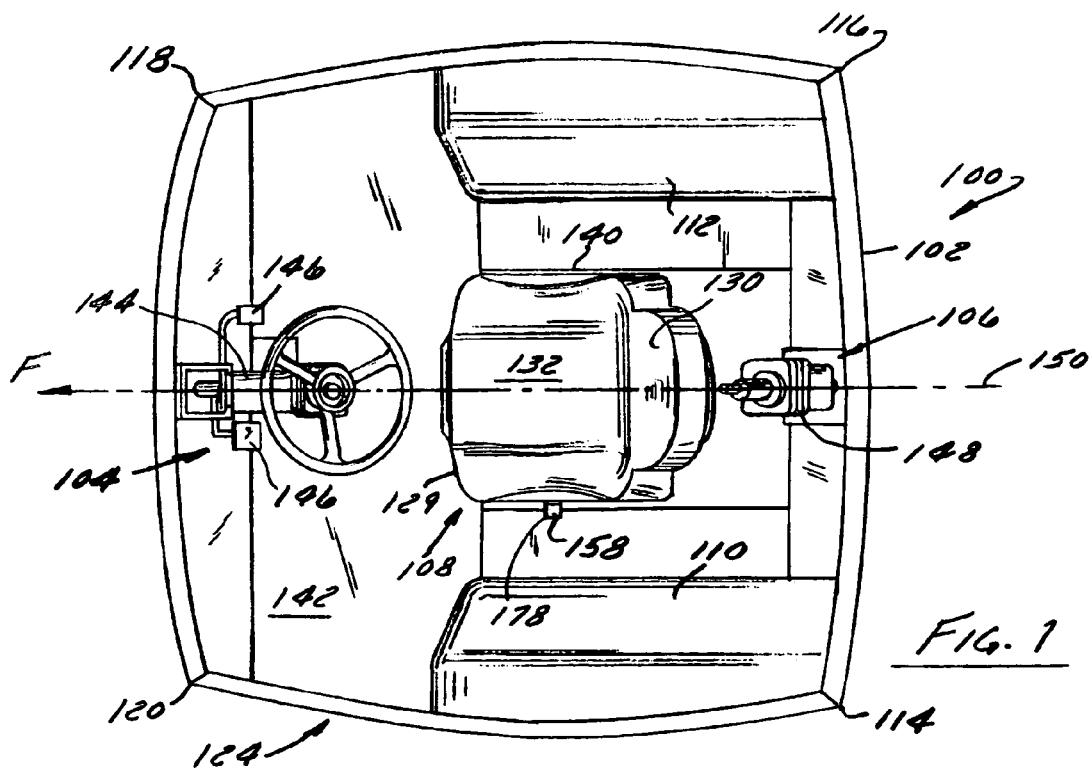
FIG. 1 is a plan view of an operator compartment of work vehicle with an operator seat in a first, forward facing position, centered on the longitudinal axis of the work vehicle.
Figure 5:
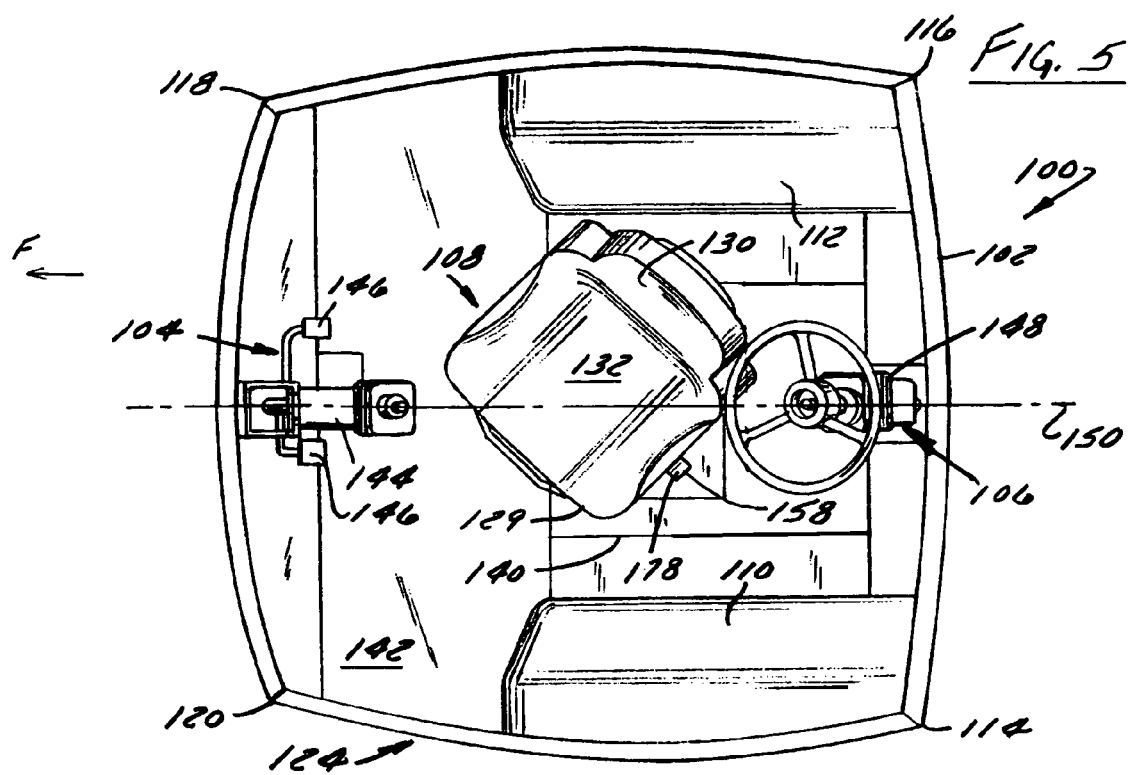
FIG. 5 is plan view of the operator compartment of the foregoing FIGURES showing the operator seat in a third position, an exit position, facing an operator door opening in the operator compartment.
Figure 6:
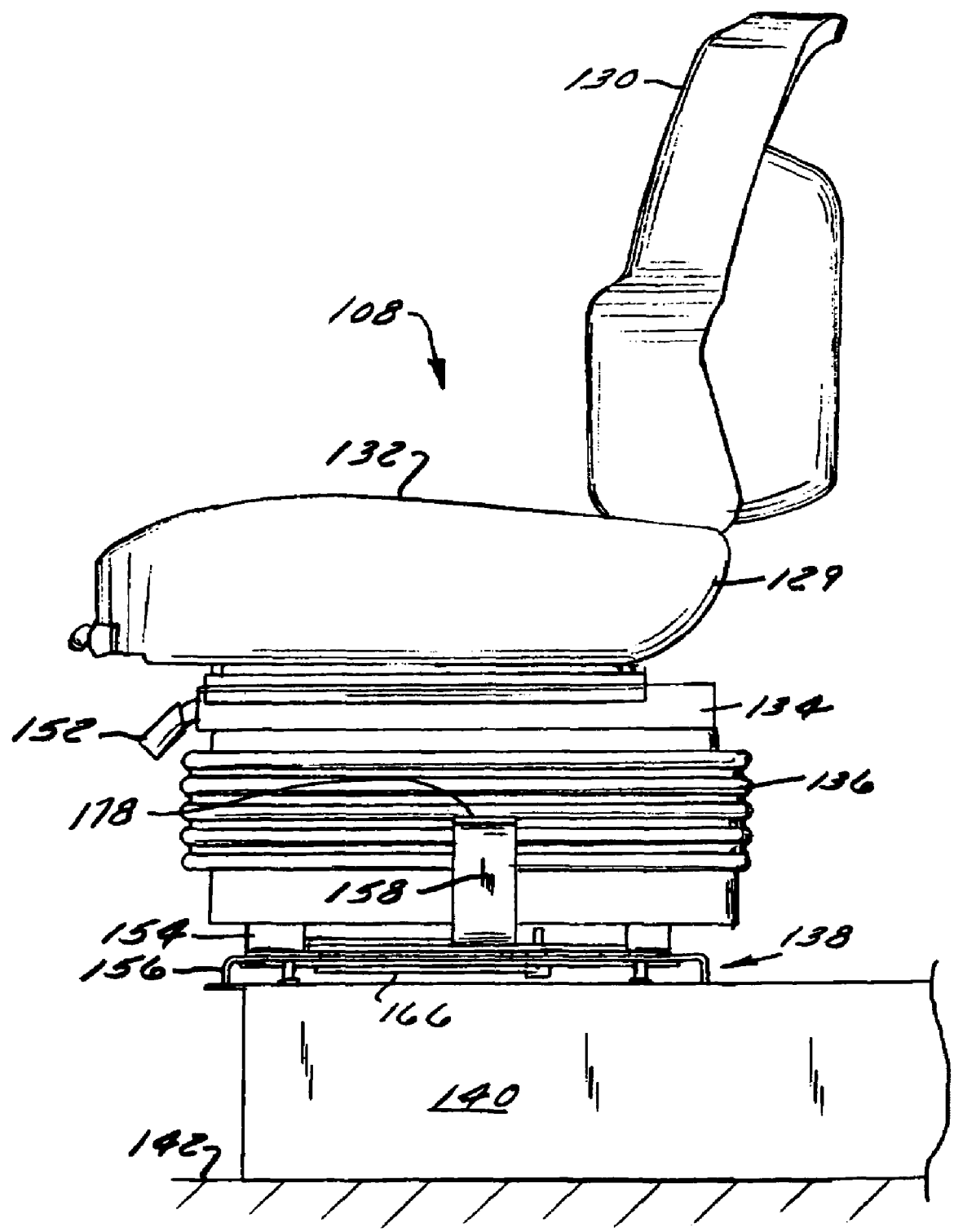
FIG. 6 is a detail left side view of the operator seat shown in the foregoing FIGURES illustrating a mechanism for rotating the seat and a mechanism for sliding the seat fore-and-aft. The seat is shown in the forward-facing position illustrated in FIGS. 1 and 2.

The movement of seat 129 along this predetermined path is shown in FIGS. 1, 3, and 5.

Figure 2:
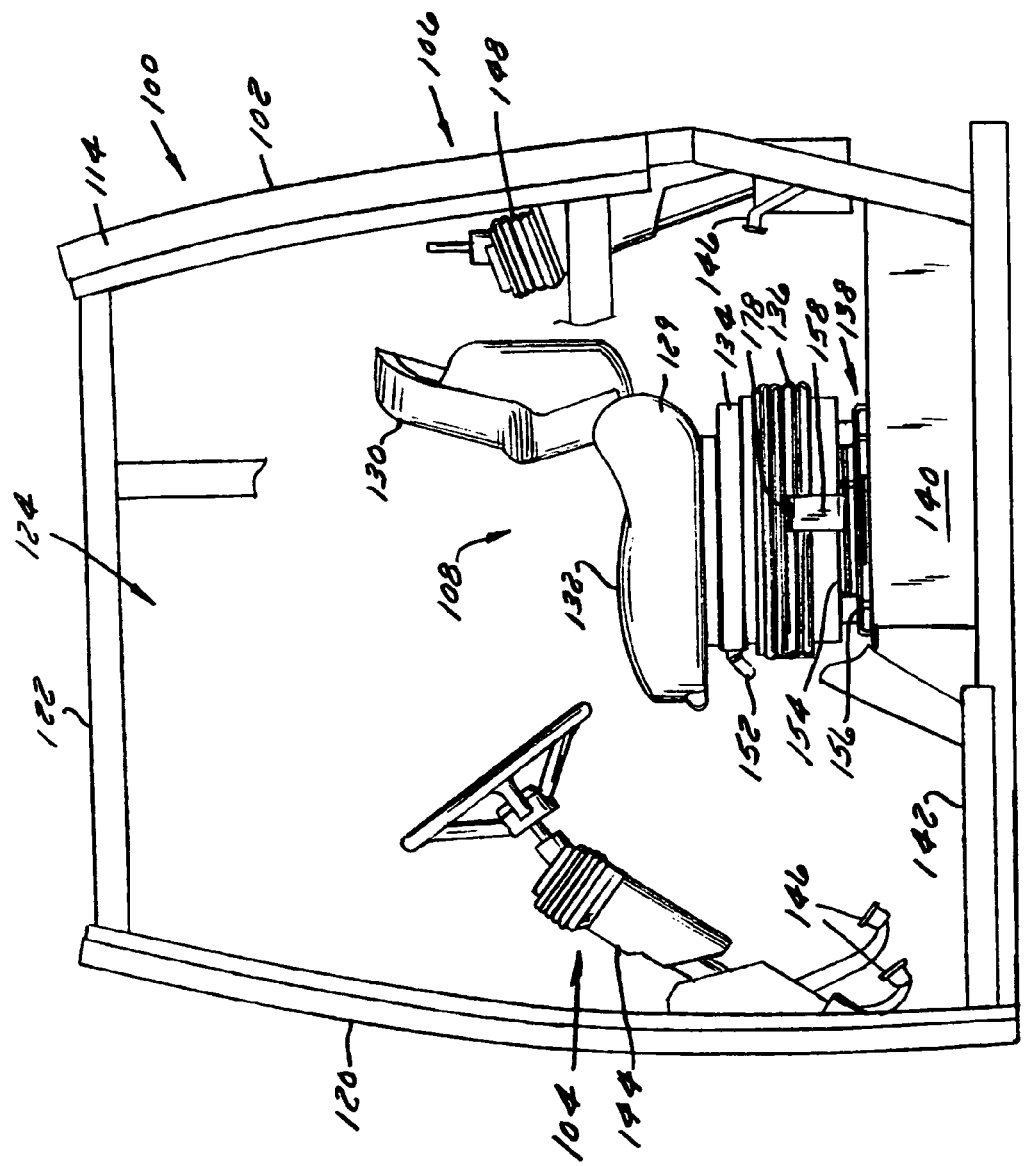
FIG. 2 is a left side view of the operator compartment of FIG. 1 showing the operator seat in the same forward facing position as shown in FIG. 1.

FIGS. 1-2 illustrate the operator compartment with seat 129 in a forward facing position. In this position, seat rotating mechanism 138 is in the position shown in FIG. 9.

Figure 4:
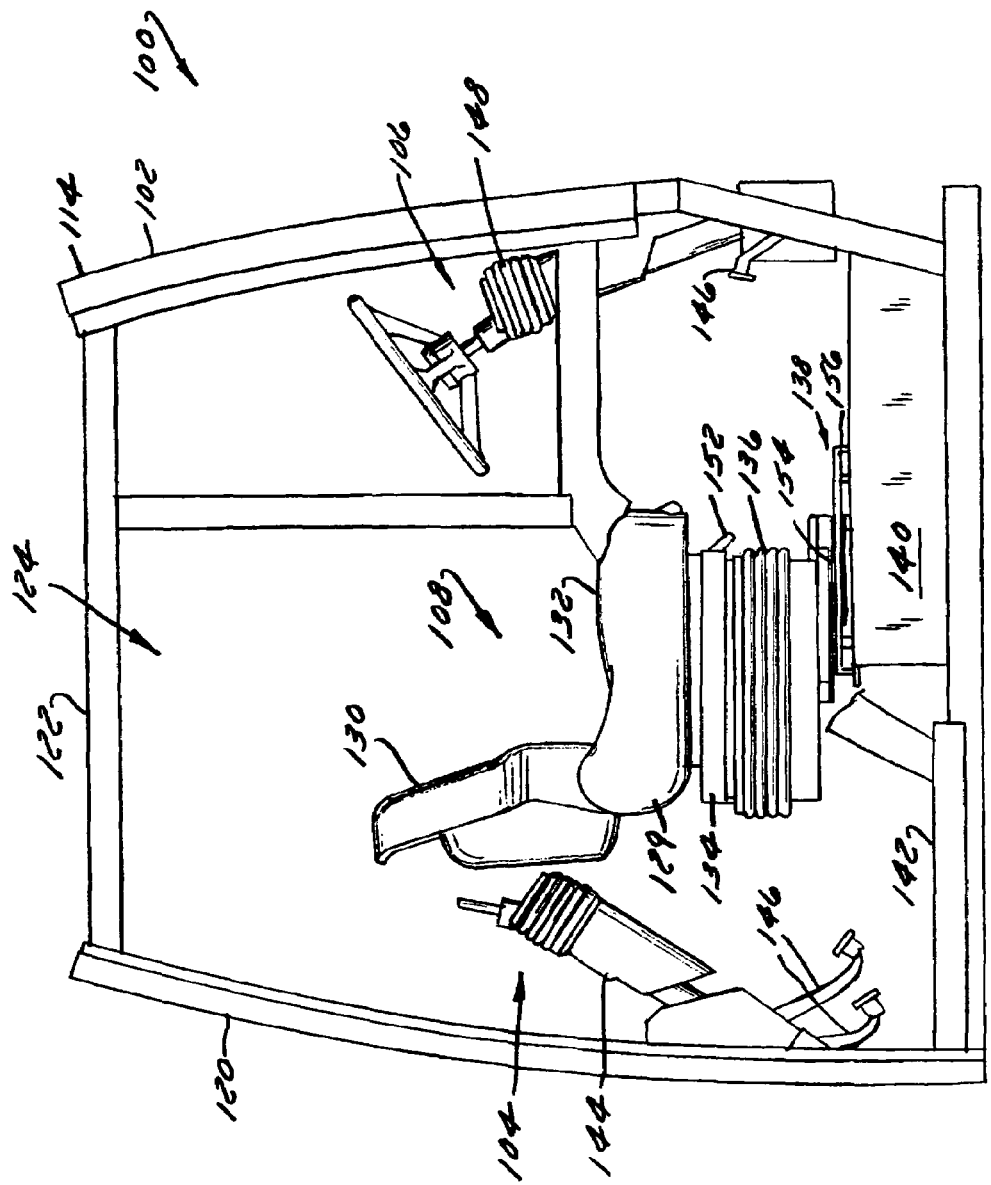
FIG. 4 is a left side view of the operator compartment of the foregoing FIGURES showing the operator seat in the same rear-facing position as shown in FIG. 3.

FIG. 3-4 illustrate the operator compartment with seat 129 in a backward facing position. In this position, seat rotating mechanism 138 is in the position shown in FIG. 10.

FIG. 5 illustrates the operator compartment with seat 129 in a position oriented 45° to the left of straight forward. In the FIG. 5 position, seat rotating mechanism 138 is in the position shown in FIG. 11. This position is intermediate the forward facing and reverse facing positions of FIGS. 1 and 3.

Figure 9:
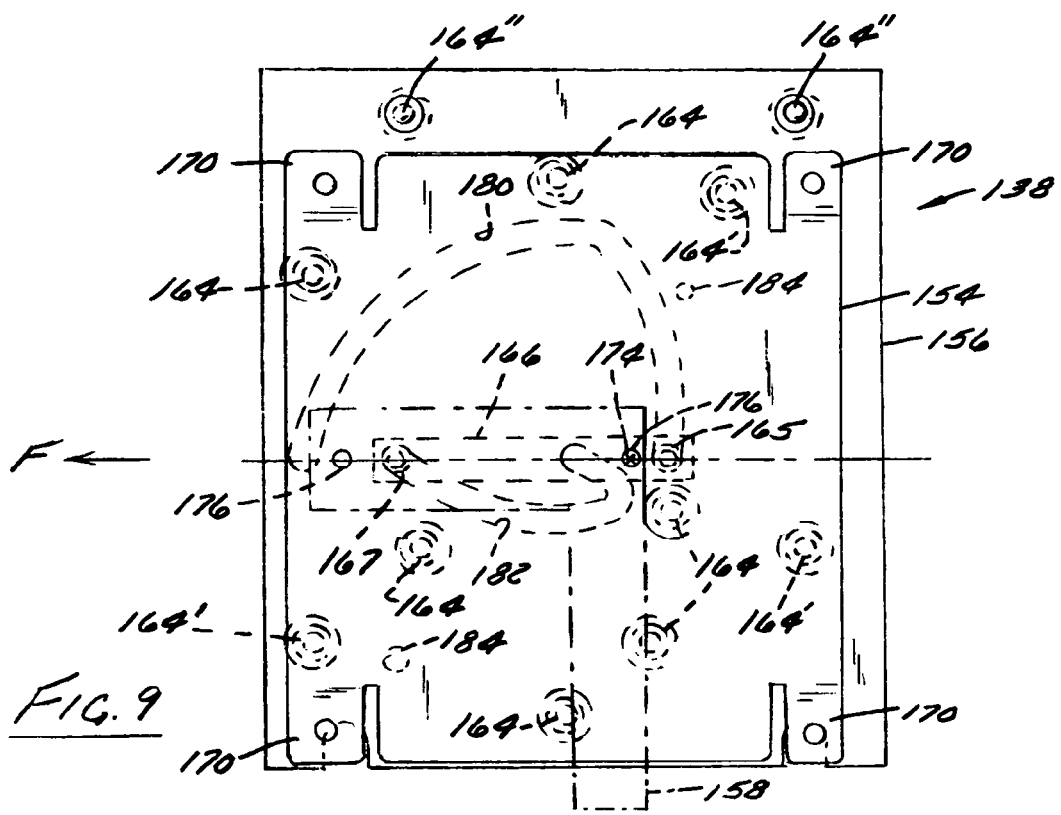
FIG. 9 is a plan view of the seat rotating mechanism of FIGS. 1-2, in which the seat is pivoted straight ahead towards the forward-facing operating station.

FIG. 9 is a detailed view of the seat rotating mechanism 138 of FIGS. 1-2. In FIG. 9, however, all the other components of FIGS. 1-2 are removed.

When seat 129 is facing straight forward (FIG. 1), seat rotating mechanism 138 is in the position shown in FIG. 9. The two cam followers are disposed at first ends of the two cam tracks 180, 182. Locking pin 174 extends into hole 176 in plate 156, locking upper plate 154 in position with respect to lower plate 156. In this position, upper plate 154 rests upon 9 of the 11 bearings 164, distributing the weight of the seat over substantially the entire width and length of upper plate 154. In this position, the operator is able to operate the controls at the forward facing operating station, e.g. grasping the steering wheel with his hands and operating the pedals with his feet.

Figure 11:
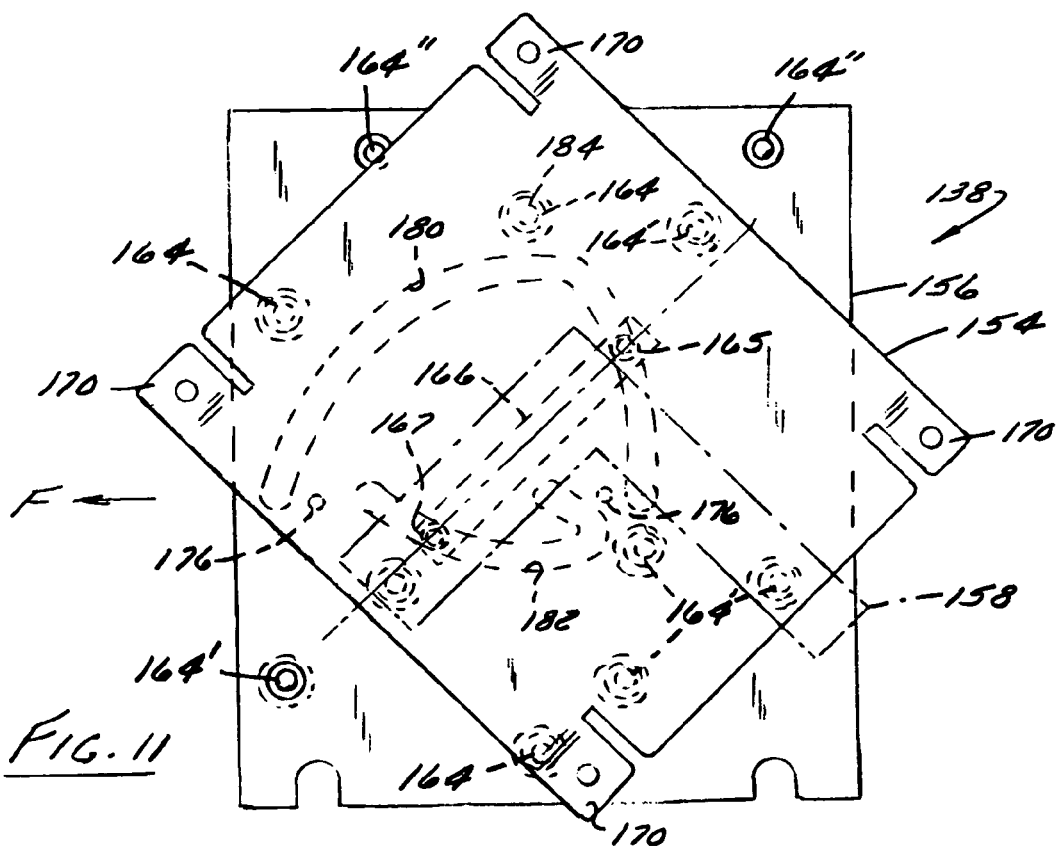
FIG. 11 is a plan view of the seat rotating mechanism of FIG. 5 in which the seat is pivoted 45° to the left of a straight-ahead position and facing the left side door opening of the operator compartment.

FIG. 11 is a detailed view of the seat rotating mechanism 138 of FIG. 5. In FIG. 11, however, all the other components of FIG. 5 are removed.

Referring now to FIGS. 5 and 11, the seat can be seen in a first intermediate position located 45° to the left of the straight-ahead position shown in FIGS. 1, 2 and 9. To get to this position, the operator would manipulate release 158, pulling pin 174 out of hole 176 and, while sitting in the seat, rotating the seat and himself with his feet until it is in the position shown in FIGS. 5 and 11. In this position, upper plate 154 is supported by 8 bearings 164. Upper plate 154 has rotated away from and loss the support of one bearing 164 when it moved from the straight-ahead position to the 45° left of straight-ahead position. A bearing which no longer supports upper plate 154 is shown as item 164' in FIG. 11.

In the position shown in FIGS. 5 and 11, the seat faces door opening 124 for operator entry and exit from the operator compartment of the vehicle. In this position, the operator can stand up and exit the vehicle without being hindered. Upper plate 154 includes recesses or detents 184 (FIGS. 9, 11), which are formed on the bottom surface of plate 154. These recesses are positioned to engage the balls of bearings 164 when seat 154 is rotated into the position shown in FIGS. 5 and 11. The recesses engage the balls and provide resistance to rotation in either direction. This increased resistance to rotation can be readily overcome by the operator applying slightly increased rotating force with his feet or hands as he sits in seat 129 sufficient to lift upper plate 154 and recesses 184 off the balls of bearings 164. In this position, the cam followers abut a first end of their respective cam paths.

There are two primary benefits to retaining seat 129 in the position of FIGS. 5 and 11 using a detent. First, it holds the seat in position even when the operator has arisen from the seat and has left the vehicle. It will not rotate while the operator is absent and will remain in the 45° position of FIGS. 5 and 11. Second, when the operator pushes downward on the seat and lifts himself out of the seat, the detents prevent the seat from suddenly spinning to the left or the right as the operator shifts his weight. Three bearings do not support the upper plate in the intermediate FIG. 11 position. They are shown in FIG. 11 as a single bearing 164' in the lower right hand corner of the FIGURE and as two bearings 164".

In an alternative arrangement to the preferred detent arrangement, an additional hole (see FIG. 10) can be located in lower plate 156 to receive locking pin 174 of release 158 whenever the seat is in the FIG. 5 position. With this additional hole, the seat has three locking positions: forward (FIGS. 1-2), 180° reverse (FIGS. 3-4), and 45° to the left side of straight ahead, facing the doorway (FIG. 5).

Figure 10:
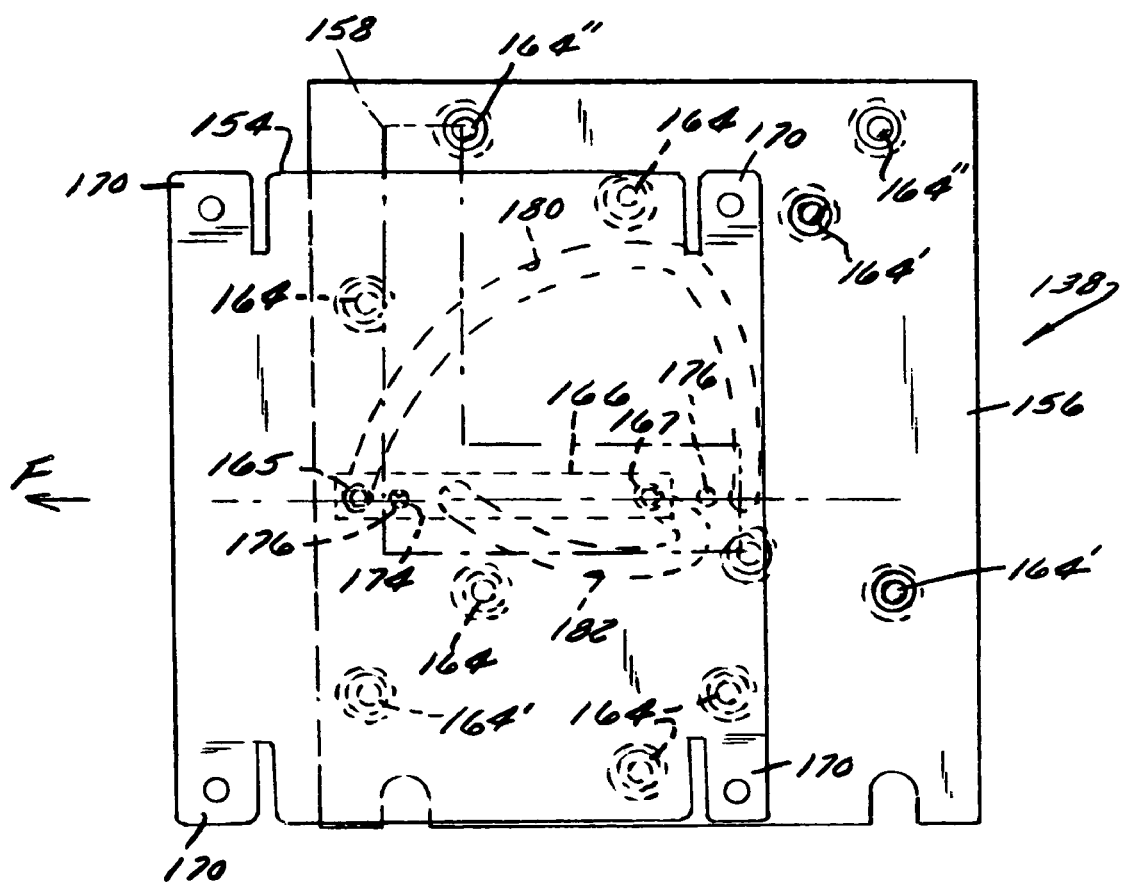
FIG. 10 is a plan view of the seat rotating mechanism of FIGS. 3-4 in which the seat is pivoted straight backwards towards the rear-facing operating station.

In the position shown in FIGS. 3-4 and 10, the seat faces straight backwards, 180° away from its position shown in FIGS. 1-2, 9. The seat is placed in this position by the operator rotating seat 129 an additional 135° counterclockwise from the position shown in FIGS. 5 and 11. In the position of FIGS. 3-4 and 10, pin 174 coupled to release 158 is disposed directly over corresponding hole 176 in lower plate 156. If the operator has previously released release 158, it will automatically press pin 174 downward into hole 176. Alternatively, if the operator has held release 158 in its raised position, he can release the release 158 and permit pin 174 to enter hole 176, thereby locking plates 154, 156 together and locking seat 129 in the illustrated position. With the seat in the position shown in FIGS. 3-4 and 10, the cam followers abut second ends of their respective cam paths that are opposite the first ends of the cam paths. In this position, the operator is able to operate the controls at the rear-facing operating station, e.g. grasping the steering wheel with his hands and operating the pedals with his feet.

There are four bearings 164 that do not support the upper plate in FIG. 10. These include two bearings 164' that are disposed along the rear edge of the lower plate, and two bearings 164" along the top of FIG. 10.

Bearings 164' in FIGS. 9-11 support the upper plate in one of its two 180 degree opposed positions but not in the other of its two 180 degree opposed positions. Bearings 164" support the upper plate only while the seat in being rotated and is in positions intermediate its forward-facing and backward facing positions. Intermediate positions in which bearings 164" support upper plate 154 are not shown herein.

Whenever seat 129 pivots or rotates from its forward-facing to its rear-facing position, the seat itself both rotates and translates. In a traditional seat having a simple fixed pivot joint, the seat rotates about the center point defined by the fixed pivot joint. It does not translate. In contrast to this, seat 129 follows a complex path as the operator rotates the seat with his arms and legs. The rear of the seat moves backward and then moves to the right. When the seat has been rotated 90° from its straight-ahead position, the rear of the seat has been translated toward the right side wheel shroud 112. Backing the rear of the seat toward the right side wheel shroud 112 provides room for the operator's knees, which (in a 90° position) are just sliding past the left side wheel shroud 110. Once the operator's knees have cleared the left side wheel shroud 110, the operator's continued turning in the seat causes the rear of the seat to translate away from right side wheel shroud 112, and toward the centerline 150 of the vehicle and operator compartment. The two operating stations are spaced so closely together that the center of the seat is translated forward when the seat is rotated to face the rear of the vehicle, and vice versa.

The movement of seat 129 with respect to the operator compartment (and hence the movement of upper plate 154 with respect to lower plate 156) has no constant center of rotation. Instead, the instantaneous center of rotation of the seat (and upper plate 154) with respect to the operator compartment continuously moves as the seat is rotated. The path followed by the instantaneous center of rotation is defined by the spacing of the cam followers and the shape of the cam paths.

It should be clear from the above that the operator is able to pivot the seat from a first position in front of a first operating station including a first set of controls accessible from that position to a second position in front of a second operating station including a second set of operator controls accessible from the second position. The rotating or pivoting mechanism illustrated herein permits the operator to do this without arising from or leaving the seat.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

We claim:

1. A pivoting seat assembly for a work vehicle having a central longitudinal axis, the seat assembly comprising:
   a solo seat;
   a sliding mechanism for sliding the solo seat forward and backward coupled to the solo seat;
   an upper plate coupled to the sliding mechanism;
   a lower plate coupled to the upper plate;
   a first cam follower;
   a first cam track interengaged with the first cam follower;
   a second cam follower; and
   a second cam track interengaged with the second cam follower; and
   a metal strap extending between and coupling the lower ends of the cam followers, the metal strap further being configured to retain the upper plate on the lower plate;
   wherein said first and second cam followers are fixed with respect to one of the first and second plates, and further wherein said first and second cam tracks are fixed with respect to a second of the first and second plates.

2. The pivoting seat assembly of claim 1, further comprising a manually operable locking pin coupled to the upper plate and configured to engage the lower plate in both a forward-facing position and a rear-facing position.

3. The pivoting seat assembly of claim 1, further comprising a first manually-operable seat lock configured to lock the sliding mechanism and a second seat lock configured to lock the first and second plates with respect to one another.

4. A pivoting seat assembly for a work vehicle having a central longitudinal axis, the seat assembly comprising:

a solo seat;

a means for sliding the solo seat forward and backward coupled to the seat;

an upper plate coupled to the sliding mechanism, the upper plate defining a first cam means and a third cam means; and a lower plate coupled to the upper plate, the lower plate defining a second cam means and a fourth cam means, wherein the second cam means is configured to engage the first cam means and to guide the first cam means along a curved non-circular cam path and the fourth cam means is configured to engage the third cam means and to guide the third cam means along a non-circular cam path; and a metal strap extending between and coupling lower ends of the first and third cam means such that the upper plate is retained on the lower plate.

5. The pivoting seat assembly of claim 4, wherein the multiple cam means constrains the seat to rotate about a vertical axis from a first position to a 180 degree opposed position.

6. The pivoting seat assembly of claim 4, wherein one of the first and second cam means is a first cam follower and another of the first and second cam means is a first cam track and wherein one of the third and fourth cam means is a second cam follower and another one of the third and fourth cam means is a second cam track.

7. The pivoting seat assembly of claim 4, further comprising first and second cam followers fixed to the upper plate, and further wherein the lower plate defines first and second non-intersecting cam paths, and further wherein the first cam follower is disposed in the first cam path and the second cam follower is disposed in the second cam path.

8. The pivoting seat assembly of claim 7, further comprising a manually operable locking pin coupled to the upper plate and configured to engage the lower plate in both a forward-facing position and a rear-facing position.

9. The pivoting seat assembly of claim 4, further comprising at least four bearings fixed to the lower plate and disposed to support the upper plate and accommodate omnidirectional movement of the upper plate with respect to the lower plate.

10. A pivoting support for an operator seat of a work vehicle, comprising:

an upper plate configured to be fixed to a solo seat, the upper plate further comprising, generally rectangular plate having an upper surface and a lower surface, first and second cam followers fixed to the rectangular plate and extending downward from the lower surface, and a locking pin extending downward from the lower surface;

a lower plate configured to be fixed to a seat support in the operator compartment, wherein the lower plate defines first and second cam paths, the first and second paths being disposed to receive the first and second cam followers; and a metal strap extending between and coupling lower ends of the cam followers, the metal strap further being configured to retain the upper plate on the lower plate.

11. The pivoting support of claim 10, further comprising:

a plurality of spaced-apart ball bearings fixed to the lower plate and configured to support the upper plate and to accommodate omnidirectional movement of the upper plate with respect to the lower plate.

12. The pivoting support of claim 10, further comprising a plurality of spaced-apart ball bearings disposed between the lower plate and the upper plate, wherein the upper plate uncovers at least one of the ball bearings during a portion of its relative rotation with respect to the lower plate.

13. The pivoting support of claim 10, wherein the upper plate is configured to be fixed to and support a seat elevator and a seat mounted thereon, and the lower plate is configured to be fixed to and supported by a raised seat platform.

14. The pivoting support of claim 10, wherein the metal strap is located on the opposite side of the lower plate from the upper plate.

* * * * *